United States Patent [19]

Merritt

[11] Patent Number: 4,898,126

[45] Date of Patent: Feb. 6, 1990

[54] INTERNAL COMBUSTION ENGINE WITH CATALYTIC IGNITION

[76] Inventor: Dan Merritt, 139 Baginton Rd., Coventry, West Midlands, Great Britain

[21] Appl. No.: 303,019

[22] Filed: Jan. 30, 1989

Related U.S. Application Data

[63] Continuation of Ser. No. 18,191, Feb. 24, 1987, abandoned.

[30] Foreign Application Priority Data

Feb. 25, 1986 [GB] United Kingdom ............... 8604635
Jul. 11, 1986 [GB] United Kingdom ............... 8616982
Dec. 9, 1986 [GB] United Kingdom ............... 8629304

[51] Int. Cl.⁴ .................... F02B 19/16; F02B 25/26; F02P 23/02
[52] U.S. Cl. .................... 123/53 A; 123/53 AA; 123/272; 123/283; 123/284
[58] Field of Search .......... 123/51 R, 51 A, 51 AA, 123/51 AC, 53 A, 53 AA, 53 B, 53 R, 73 C, 272, 284, 286, 664, 665, 670

[56] References Cited

U.S. PATENT DOCUMENTS

| 642,176 | 1/1900 | Thomson | 123/53 A |
|---|---|---|---|
| 2,234,267 | 3/1941 | Mallory | 123/53 A |
| 2,246,019 | 6/1941 | Steinlein | 123/73 C |
| 3,923,019 | 12/1975 | Yamada | 123/53 BA |
| 3,934,562 | 1/1976 | Isaka | 123/53 B X |
| 3,970,057 | 7/1976 | Schauer | 123/53 BA X |
| 4,106,445 | 8/1978 | Beveridge | 123/53 A |

FOREIGN PATENT DOCUMENTS

| 458854 | 4/1928 | Fed. Rep. of Germany | 123/51 A |
|---|---|---|---|
| 666222 | 10/1938 | Fed. Rep. of Germany | 123/53 B |
| 1187255 | 3/1959 | France | 123/53 A |
| 77121 | 5/1983 | Japan | 123/272 |
| 301908 | 12/1954 | Switzerland | 123/51 A |
| 2155546 | 9/1985 | United Kingdom |  |

Primary Examiner—Michael Koczo
Attorney, Agent, or Firm—Renner, Otto, Boisselle & Sklar

[57] ABSTRACT

A catalytic internal combustion engine has an air cylinder (12) and a fuel management cylinder (14) interconnected at their head ends by a combustion chamber (5) and having respective pistons (16, 18) reciprocating in phase. Petrol is injected into the fuel management cylinder where is vaporizes in air during the compression stroke to form a very high air/fuel vapor mixture which cannot be spontaneously ignited by the high compression pressures used in the engine. Low octane petrol is a suitable fuel even when compression ratios of 12–16:1 are used. Air from cylinder (12) is forced into the combustion chamber (5) during the compression stroke through a port (44) which imparts a vortex motion in the air in the chamber (5). This mixes with the fuel/air mixture entering the combustion chamber from cylinder (14). A thin platinum layer catalyst on the wall of the combustion chamber triggers compression ignition of the fuel/air mixture as it mixes with the air in the combustion chamber. The continuous ignition produced by the catalyst as fuel molecules contact it results in complete combustion of the fuel/air mixture. Since the catalyst is capable of igniting very lean fuel/air mixtures which cannot be spark ignited considerable fuel economy is achieved with complete combustion and low exhaust emission, obviating the need for catalytic after burners in the exhaust system.

23 Claims, 5 Drawing Sheets

INTERNAL COMBUSTION ENGINE WITH CATALYTIC IGNITION

This is a continuation of co-pending application Ser. No. 018,191 filed on Feb. 24, 1987, now abandoned.

The present invention relates to internal combustion engines.

The basic principle of the Otto cycle internal combustion engine has remained largely unchanged since its inception, except for the invention of the diesel engine. Both the spark ignition engine and diesel engine are inefficient and have disadvantages particularly with regard to fuel economy and pollutant exhaust emission. In the past, these disadvantages have not been particularly important but in recent years with, for example, increasing legislation regarding the content of engine exhaust emissions and the high cost of fuel, attempts have been made to improve the overall performance and economy of internal combustion engines. These attempts, such as the Wankel engine and the so-called "lean burn" engine have proved only partially successful, despite considerable time and resources being spent on their development.

The present invention seeks to provide an improved form of internal combustion engine.

Accordingly, the present invention provides a compression ignition internal combustion engine comprising at least one pair of first and second cylinders interconnected at their head ends by a combustion chamber, said first cylinder being adapted to receive a charge of air and said second cylinder being a fuel management cylinder adapted to receive a charge of fuel;
  catalyst ignition means in said combustion chamber;
  respective first and second pistons reciprocable in said cylinders towards and away from said combustion chamber;
  means for assisting rapid mixing in said combustion chamber of a fuel/air mixture from said fuel management cylinder with air from said first cylinder;
  and wherein the initiation of combustion of said combustion chamber is independent of the timing of the introduction of said fuel charge into the fuel management cylinder.

The term "air or the like" used herein includes any suitable mixture of oxygen with other usually inert gases as well as substantially pure oxygen for combustion with a gaseous or liquid (i.e. vaporised liquid) fuel. It may contain recirculated crank case gases and a small proportion of Hydrocarbon substances which may be present in recirculated crank case gases.

The present invention is further described hereinafter, by way of example, with reference to the accompanying drawings, in which like parts have the same reference numbers and in which.

Figure 1:
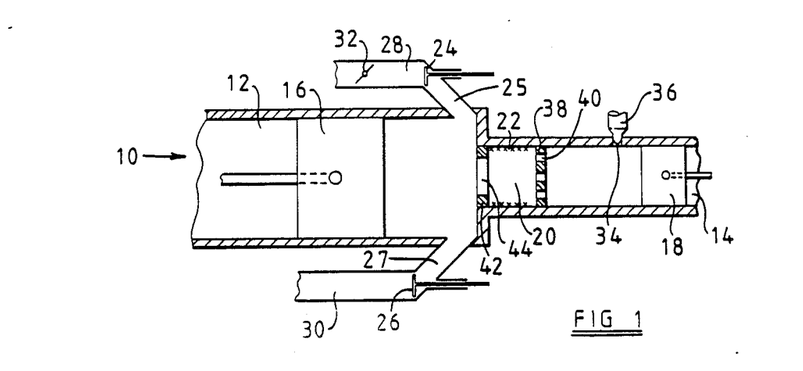
FIG. 1 is a diagrammatic illustration of a partial section through an in-line internal combustion engine according to the present invention.

Referring now to the drawings, FIG. 1 is a diagrammatic illustration of an engine 10 according to the present invention, practical examples of which are shown in the subsequent drawings. The engine 10 has one or more pairs of co-operating cylinders 12, 14 containing respective pistons 16, 18 the cylinders 12, 14 being arranged with their axes axially aligned. The head ends of the cylinders 12, 14 are in continuous communication by a common clearance volume in which a combustion chamber 20 is situated. One cylinder 12, the major cylinder, is of larger swept volume than the other cylinder 14, this cylinder being referred to as an air cylinder. The minor cylinder 14 has a smaller swept volume and is referred to as a fuel management cylinder.

The pistons in both cylinders are connected to two crank shafts which are mechanically coupled together, for example by a belt or chain, the larger piston 16 being connected to the major crankshaft of the engine. Alternatively, the small piston 18 may be coupled to the larger piston's crank shaft by a rocking bar arrangement instead of being provided with a second, minor crank shaft. In the preferred form of the engine, the pistons are coupled in phase and move in unison, that is, they reach IDC (inner dead center) and ODC (outer dead center) at the same time, but the engine will operate with the smaller piston 18 slightly lagging behind the larger piston 16. Preferably, there is no phase change between the two pistons as engine speed increases or decreases, although the facility for the phase to vary with change in speed may be incorporated if desired. Both major and minor crankshafts are parallel for multicylinder engines.

Although the above description refers to reciprocating pistons, the pistons may equally be rotary pistons in an engine arrangement such as the Wankel engine arrangement.

The air cylinder 12 communicates with an air inlet port 25 and an exhaust port 27 respectively of inlet and exhaust ducts 28, 30. The opening and closing of the ports is preferably controlled by valves 24, 26 such as poppet valves, actuated by a cam. Alternatively, the valves may be of other types such as rotating sleeve valves. Although the ports are shown in FIG. 1 opening into the cylinder at or adjacent IDC either or both may equally be covered or uncovered by the air piston 16 itself during its movement, particularly when the engine is constructed to operate on the two stroke principle. One or both ports may open directly into the combustion chamber 20.

The combustion chamber 20 contains ignition means in the form of a catalyst 22, preferably in the form of a film on part or all of the internal wall or walls of the chamber.

The preferred fuel is a volatile liquid such as gasoline (petrol). Lead free petrol, or petrol without antiknock additives can be used if preferred even with high engine compression ratios (such as 10-16). Gaseous fuels can also be used if injected under moderate pressure.

Fuel is introduced through a fuel inlet port 34 in the fuel management cylinder 14. For volatile liquid fuels such as gasoline (petrol) a low pressure fuel injector 36 which may be activated electromagnetically is positioned so as to discharge the fuel into the inlet port. Preferably, the fuel inlet port is positioned in the cylinder wall as near the piston ODC as is necessary to inject the required amount of fuel so that injection occurs preferably towards the latter part of the induction stroke and the early part of the compression stroke. This allows the piston 18 to shield the injector 36 during the high pressures encountered during the latter part of the compression stroke and earlier part of the expansion stroke. The injector should preferably atomise the fuel into small droplets. An injector capable of withstanding higher pressures and temperatures can be situated near a port opening anywhere in the smaller cylinder. The injector may be pointed towards the outer surface of the combustion chamber facing the minor cylinder so that a hot surface of the combustion chamber may assist in the vaporisation of the liquid fuel.

Although injection of fuel can be timed to start during the compression stroke, it is preferably timed to start at some point during the induction stroke and ideally is timed to commence as soon as the fuel inlet port 34 is uncovered by piston 18. The duration of injection can be used to control the quantity of fuel injected hence the power output of the engine.

The maximum duration of fuel injection is fixed by the period between the uncovering and recovering of the port 34 by piston 18 towards the end of the induction stroke and the early part of the compression stroke and is therefore influenced by the position of the fuel inlet port 34 relative to the position of the piston 18 at ODC. When a shorter injection time is required this can be determined by switching off the injector before the port 34 is covered by the piston during the compression stroke. During the fuel injection process the volatile fuel is sprayed into the smaller proportion of the air induced into the fuel management cylinder 14, in comparison with the total amount of air induced by the engine as a whole into the combination of cylinders 12 and 14. One advantageous feature of this engine is that the fuel is injected into air during the low pressure part of the cycle, when air is at its induction pressure, and the early part of the compression pressure, and so the fuel injector need not overcome high gas pressures in the cylinder 14.

Another advantageous feature, in comparison with a diesel engine, is that the timing of the fuel injection process does not determine the timing of the initiation of combustion in the engine. There is therefore no need to advance or retard the timing of the initiation of the fuel injection process.

During the compression stroke which follows the induction stroke the gas in the fuel management cylinder 14 undergoes a temperature rise and the atomised liquid fuel will vaporise. The duration of the compression stroke gives the fuel sufficient time to vaporise at least partially and to form a rich gaseous mixture (well above stoichiometric fuel/air mass ratio at full power and most of the substantive power range of the engine) since the fuel input into the minor cylinder 14 is designed eventually to mix with the total mass of air in the engine contained in both cylinders 12 and 14.

The amount of swept volume of the minor cylinder allows the rich mixture in the minor cylinder to be above the rich flammability limit for full and high power modes of operation. This avoids premature ignition by compression induced temperatures when high compression ratios (maximum to minimum volume ratios, during the cycle, for the cylinder pair e.g. 12-16) are designed into the engine geometry, even when suitable low octane fuel, such as lead free petrol(gasolene) is used.

The vaporisation of the atomised fuel into the air contained in the minor cylinder 14 during the compression stroke extracts heat from this air to provide the necessary latent heat for vaporisation and in so doing lowers the temperature and the pressure (or at least reduces the rate of increase) of the air/fuel mixture in cylinder 14 below the pressure prevailing in the air being compressed in the major cylinder 12 which contains no fuel. This in turn assists the migration of air from cylinder 12 to cylinder 14 during the compression stroke by inducing or enhancing a pressure differential between the two cylinders. This migration has two beneficial effects.

(i) It keeps fuel away from the catalyst in the combustion chamber 20 until the latter part of the compression stroke.

(ii) It allows extra mass of air to migrate from cylinder 12 and the combustion chamber into the minor cylinder and mix with the air received during the induction stroke and the fuel injected through the fuel inlet port 34. This migration is increased with increasing quantities of fuel injected to increase power so providing enough air into the minor cylinder to allow the fuel vapour to remain above its dew point temperature and help to maintain the rich fuel/air mixture in cylinder 14 within a desirable fuel/air mass ratio range, against which the combustion chamber design can be optimised. The air delivered to the combustion chamber by the major piston is made to swirl in a vortex motion in a cylindrical, or spherical or spheroidal shaped combustion chamber in the preferred form of the engine (e.g. FIG. 2). This vortex motion may also assist in inducing extra migration of air into the minor cylinder during the compression stroke.

Figure 2:
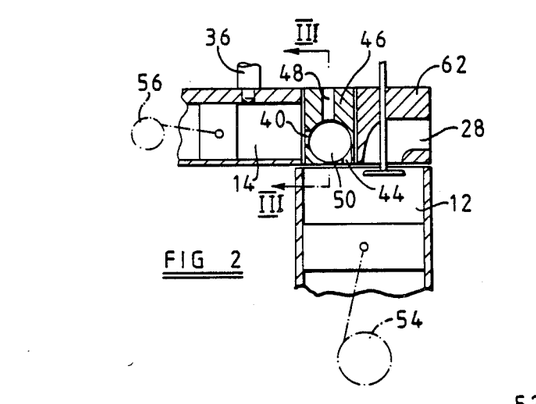
FIG. 2 is a partial section through a preferred, practical form of invention.
Figure 3:
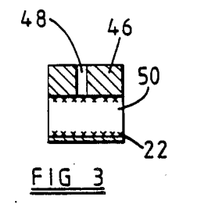
FIG. 3 is a section III—III of FIG. 2.

It is possible to use gaseous fuels for injection into cylinder 14 through the fuel inlet port 34 but in this case the migration of air from the cylinder 12 to the fuel management cylinder can be achieved by leading the movement of the major piston 16 in relation to the movement of the minor piston 18, and/or by the pressure of the air swirling in vortex motion in the combustion chamber in the preferred form of the engine shown in FIG. 2.

The operations performed by the fuel management cylinder 14 during the induction and compression parts of the cycle amount to the admission, vaporisation and primary mixing of the fuel with some air to form a rich gaseous mixture of fuel and air which is then delivered to the combustion chamber 20. These operations ensure the efficient and successful performance of the engine and justify the description of the minor cylinder 14 as the fuel management cylinder.

Both pistons 16 and 18 deliver their gases into the combustion chamber 20 during the compression stroke, in the case of the minor cylinder 14 this being towards the end of the compression stroke when the migration of air from cylinder 12 to cylinder 14 ceases. The entry of the rich fuel/air mixture into the combustion chamber is accompanied by rapid mixing assisted by suitable means and devices described further below.

Ignition in a catalytic engine is a compression ignition process and depends on the engine being designed to promote a sufficiently high peak compression pressure and temperature when the pistons are near IDC, allowing for the chilling effect of the vaporising fuel in the minor cylinder 14. The ignition is assisted by the catalyst 22.

The latter initiates the early part of the chemical reaction which, in turn, generates enough heat to ignite the remaining fuel into a flame. The swirling vortex motion in the combustion chamber continues during the ignition period and ensures a prolonged contact with the catalyst over a period of time to promote a rapid and complete combustion.

The inlet duct 28 communicating with the inlet port 24 is normally unrestricted in relation to the movement of air but may contain a restricting or throttling device, such as a butterfly valve 32 as a means of controlling the amount of air admitted to the engine. This may be required during engine idling and/or low load conditions when little fuel is used and the mixture in the minor cylinder needs to be kept above the rich flammability limit with a high compression engine. It may also be required at full load and low speed when high volumetric efficiency can give rise to excessive pressures in the combustion chamber and early ignition. The function of the air cylinder 12 is to admit the larger proportion of the air needed by the engine and to compress it during the compression stroke and deliver it to the combustion chamber 20 there to be given a fast rotational movement which allows it to mix with the fuel/air gaseous mixture delivered to the combustion chamber from the fuel management cylinder 14,(the minor cylinder).

Control of the throttling, if used, is preferably effected automatically by a suitable control system built into the engine management system.

The engine is designed to achieve ignition of the mixture at the time in the cycle when maximum compression pressure and temperature are reached, namely at or near IDC, and to expose a well mixed fuel/air mixture to the catalyst at that instant. Under some conditions e.g.low speed and full power, if ignition occurs too early in a particular engine design a slight throttling of the air intake by the butterfly rake 32 can be used to reduce slightly the peak pressure and temperature at IDC and so retard the ignition timing.

The engine requires a minimum of one air inlet valve, one exhaust valve preferably and one port for fuel injection, the air inlet valve supplying air directly to the larger cylinder 12 while the fuel injection port 34 enables fuel to be injected directly into the smaller cylinder 14. More inlet and/or exhaust valves can be provided e.g. one pair per cylinder. Poppet type valves which are cam activated are suitable.

The combustion chamber 20 occupies substantially the clearance volume in the engine, i.e. the minimum volume when the piston pair are nearest each other. The catalyst 22 agent can be platinum, palladium or rhodium or a platinum rhodium alloy either in a form of wire mesh or deposited on the surface of a metal carrier such as temperature resistant steel, or a ceramic liner forming the walls of the combustion chamber . The catalyst has the property of initiating the oxidation process of the fuel at a lower temperature than would otherwise be possible, to initiate a rapid chemical reaction suitable for use in an engine, and also with fuel/air mass ratios, particularly very lean ratios, which may be ouside the self flammability limits which can be initiated by either compression ignition or spark ignition methods.

The temperature required to initiate the chemical reaction by the catalyst rapidly enough for use in an engine is obtained by compression of the gases in the engine and the maximum temperature occurs when the volume of the gas is near its minimum. This principle is used to set the ignition timing in the cycle as the rate of chemical reaction initiated by the catalyst can be very rapid at the correct temperature. The engine is therefore ignited by compression with catalytic assistance.

Once the chemical reaction commences it is important to ensure that the absorption of thermal energy by surfaces, including the catalyst 22, in the combustion chamber 20 is minimised. For this reason, the catalyst is preferably deposited on the wall or part of the wall of the combustion chamber or placed in an insert which forms at least part of the wall of the combustion chamber.

Placing the catalyst surface within the volume of the combustion chamber on a specially added carrier where it would interfere with the gas flow and add extra heat absorbing mass within the combustion chamber , as opposed to it forming a surface of the chamber, should be avoided. The catalysed surface 22 preferably starts some distance away from the area of entry of fuel/air mixutre into the combustion chamber. This assists in avoiding an early ignition and allows more time for the mixing of fuel and air in the combustion chamber prior to ignition.

The efficient operation of the engine depends on a process which allows the rich fuel/air mixture delivered to the combustion chamber by piston 18 to mix with the air delivered to the combustion chamber by piston 16, otherwise the initiation of chemical reaction by the catalyst can remain confined to the rich mixture. The fuel/air mixture can thus be starved of oxygen and undergo incomplete combustion.

The time allowed to achieve this mixing, which takes place when both pistons move towards IDC position, is short and the engine includes the means of ensuring that near IDC the air and fuel in the combustion chamber 20 are sufficiently well mixed to promote the movement of a flame front away from the catalyst surface where ignition takes place. The mixing of the primary fuel/air mixture delivered from the minor cylinder 14 with the remaining air delivered to the combustion chamber by the larger piston 16 results in a mixture within the flammability limits which can sustain a flame outside the zone of direct contact with the catalyst 22.

A partition surface 38 is placed adjacent to the minor piston 18 at its IDC position. It is provided with apertures 40 which increases the velocity with which the fuel/air primary mixture penetrates into the combustion chamber 20 and distributes the fuel/air primary mixture to assist homogeneous mixing with the air in the chamber. A similar partition surface 42 with an aperture 44 is placed adjacent to the major piston 16 at its IDC position.

The combustion chamber may be shaped in a way which generates swirl (e.g. a cylinder, sphere or spheroid) or the apertures 40 may provide a rotational or radial movement to the primary fuel/air on entry to the combustion chamber FIGS. 2 to 5 show a practical embodiment of internal combustion engine according to the present invention in which the cylinders 12, 14 are arranged with their axes at right angles to one another and their pistons coupled to respective crankshafts 54, 56. As can also be seen, the combustion chamber 50 is generally cylindrical, although any other suitable shape allowing rotation of the gases may be used. The combustion chamber is arranged with its longitudinal axis substantially at right angles to both axes of the cylinders 12 and 14, although again any other suitable orientation may be used. The combustion chamber itself is contained within a removable cannister 46 which enables removal and replacement of the combustion chamber and therefore the catalyst 22 should this prove necessary or desirable (e.g. for renewal or cleaning).

As is mentioned above, the engine will benefit from swirl in the comustion chamber to assist the mixing of fuel and air. Swirl may be induced in the combustion chamber when the major piston delivers air into it with a tangential velocity component through a tangential port 44.

A preferred way of promoting very rapid mixing in the combustion chamber 20 is to make the chamber shape cylindrical or spherical spheroidal and to introduce air from the major cylinder into the combustion chamber through an aperture so positioned as to induce a rapid swirl or vortex motion in the air within the combustion chamber. The fuel/air mixture may enter the combustion chamber from the minor cylinder 14 in a similar way, or radially or axially, to give the best and most rapid mixing configuration whilst avoiding premature ignition.

Figure 4:
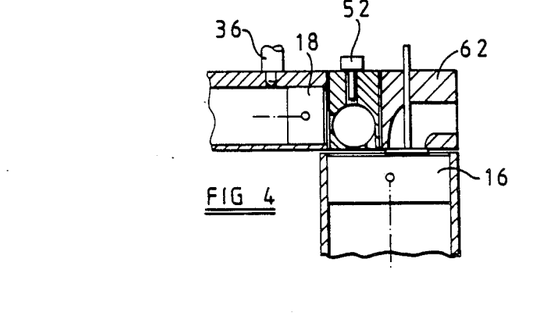
FIG. 4 is a view of the engine of FIG. 2 showing the pistons at inner dead center (IDC) position.
Figure 5:
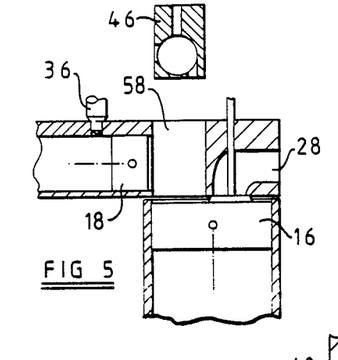
FIG. 5 is a view of the engine of FIG. 2 showing a combustion chamber cannister of the engine being removed.

As can be seen in FIGS. 2, 4 and 5 the combustion chamber 50 has an entry port 44 which opens tangentially into the combustion chamber 50. This delivers air from the major cylinder 12 into the combustion chamber with a tangential velocity component to cause the air to rotate at high speed in a vortex type motion, inducing swirl in the combustion chamber to assist mixing with the fuel/air mixture entering the chamber through port 40 from the fuel management cylinder 14.

The combustion chamber cannister 46 is also provided with an aperture 48 to allow fitting of a glow plug 52 or spark plug or other suitable ignitor for use in starting the engine.

Figure 6:
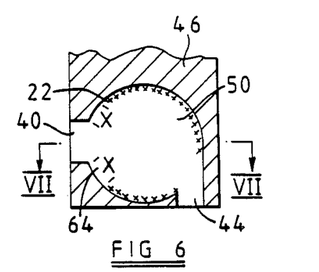
FIG. 6 is a sectional side elevation of a modified form of combustion chamber cannister with a cylindrical combustion chamber for the engine of FIGS. 2 to 5.
Figure 7:
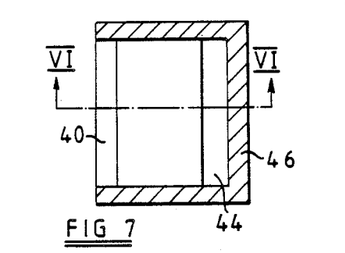
FIG. 7 is a section along the line VII—VII of FIG. 6.

FIGS. 6 and 7 show the combustion chamber 50 and cannister 46 of FIGS. 2 to 5 in greater detail with the aperture 48 omitted. In this case the fuel/air mixture enters the combustion chamber 20 radially through port 40 while air enters tangentially through port 44, thus rotating in a vortex motion in the chamber. In FIG. 6 the catalysed surface 22 is shown as starting a distance X from the port 40 This can be used to assist in delaying ignition to allow for mixing of the fuel/air mixture from cylinder 14 with air from cylinder 12.

Figure 8:
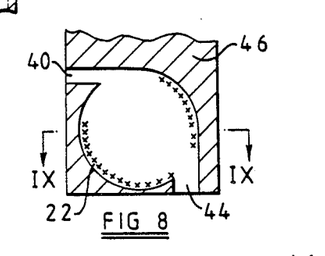
FIGS. 8, 9 and 10, 11 and 12, 13 are views similar to those of FIGS. 6 and 7 showing further modified forms of combustion chamber cannister.
Figure 9:
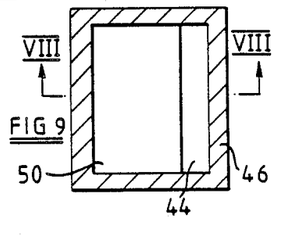

FIGS. 8 and 9 show a further mixing arrangement for combustion chamber 50 in which both the fuel/air mixture from cylinder 14 and air from cylinder 12 are delivered to the combustion chamber with a tangential velocity component in relation to the chamber, resulting in the two gas streams moving in opposite directions.

Figure 10:
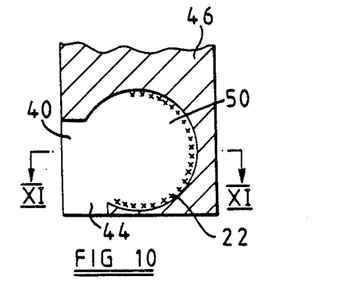
Figure 11:
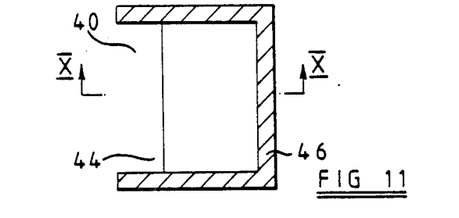

In the combustion chamber 50 and cannister 46 shown in FIGS. 10 and 11 a combined port 40, 44 is provided for both the air from cylinder 12 and the primary air/fuel mixture from cylinder 14. This induces swirl in the same direction for both gas streams.

Figure 12:
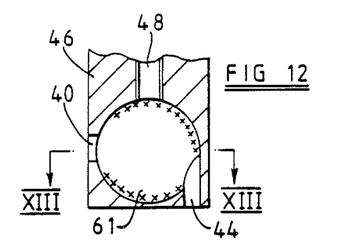
Figure 13:
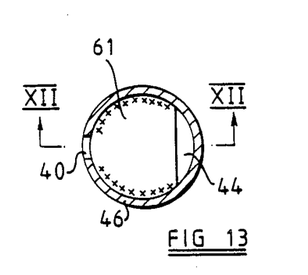

FIGS. 12 and 13 show a combustion chamber similar to that of FIGS. 6 and 7 but with the combustion chamber 61 being spherical.

The tangential entry ports for the combustion chambers of FIGS. 6 to 13 induce fast vortex motions in the combustion chamber to assist rapid mixing before ignition, during ignition and during the combustion process. This allows the flame to reach most of the fuel in the combustion chamber. The continual rotation of the gases also brings unburnt fuel in contact with the catalytic surface where it ignites. The use of cylindrical (or spherical) combustion chamber with the catalyst covering the walls results in ignition being induced over a surface so that the flame spreads rapidly from the surface, inwardly to the inner volume of the combustion chamber.

One advantage of the engine of FIGS. 2 to 5 is that it results in a lower engine and the catalyst 22 can be extracted from the head 62 of the engine as a removable and therefore renewable cannister without the need to dismantle the engine head from the major cylinder block.

Figure 14:
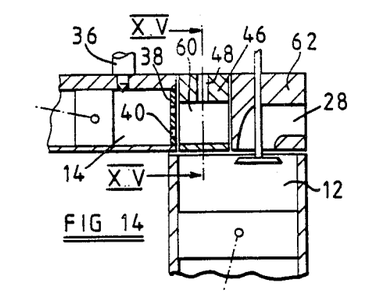
FIG. 14 is a partial section through a further embodiment of an engine according to the present invention.
Figure 15:
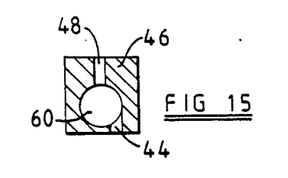
FIG. 15 is a section along the line XV—XV of FIG. 14 showing details of the combustion chamber cannister.

In the embodiment of FIGS. 14 and 15 the longitudinal axis of the combustion chamber 60 extends in the same direction as that of cylinder 14 and is preferably coaxial or parallel with that of cylinder 14.

In this embodiment, air from the air cylinder 12 is introduced tangentially into the combustion chamber through port 44, inducing a vortex motion in the chamber. The primary fuel/air mixture from the minor cylinder enters the combustion chamber axially through apertures 40 in the partition surface 38 which direct it for best mixing with the rotating air.

Figure 16:
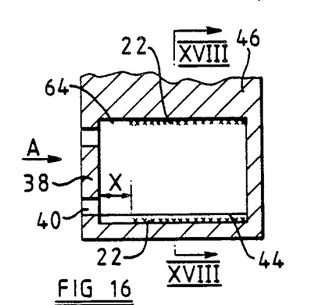
FIG. 16 is a section along the line XVI—XVI of FIG. 18 showing a further embodiment of combustion chamber cannister with a cylindrical combustion chamber.
Figure 17:
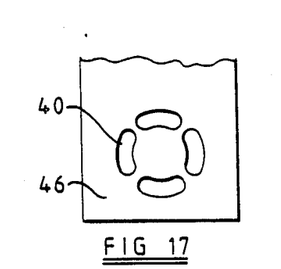
FIG. 17 is a view of the cannister of FIG. 16 in the direction of arrow A.
Figure 18:
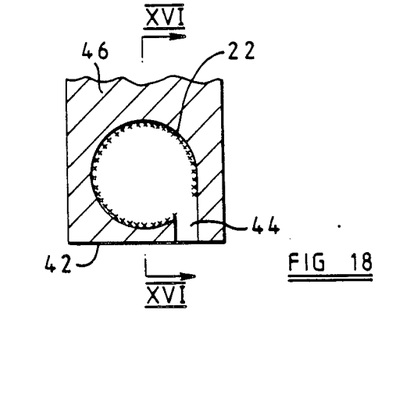
FIG. 18 is a section along the line XVIII—XVIII of FIG. 16.

FIGS. 16 to 18 show a further form of combustion chamber cannister 46 in which the partition surface is formed as an end wall of the combustion chamber cannister with arcuate apertures 40 being arranged in a circular pattern.

Figure 19:
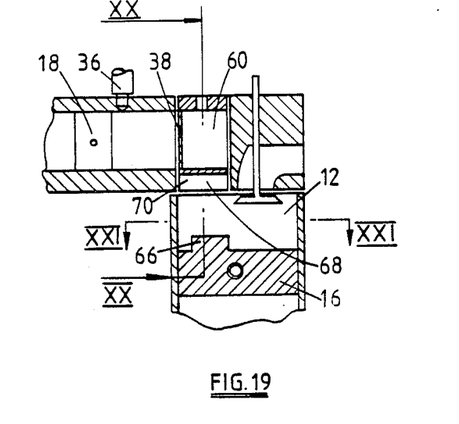
FIG. 19 is a partial section through a further embodiment of internal combustion engine according to the present invention.
Figure 20:
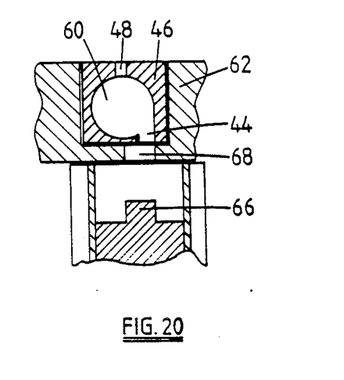
FIG. 20 is a section along the line XX—XX of FIG. 19.
Figure 21:
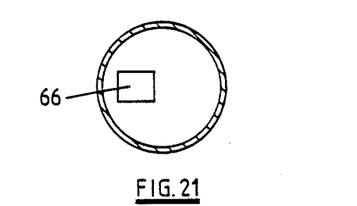
FIG. 21 is a section along the line XXI—XXI of FIG. 19.

FIGS. 19 to 21 show a further embodiment of internal combustion engine according to the present invention in which the squish principle is used to further assist the mixing process. The major piston 16 has a rectangular protrusion 66 formed on its head to promote "squish" near IDC. In contrast with the previously described embodiments, the combustion chamber cannister 46 of FIGS. 19 to 21 does not form part of the cylinder head wall enclosing the cylinder 12 but is spaced from the cylinder 12 by a portion of the cylinder head 62. Cylinder 12 communicates with the entry port 44 of the combustion chamber 60 by way of a 'squish" port 68 passing through the cylinder head.

As can be seen from FIGS. 19 and 20 the projection 66 only partially fills the "squish" port 68 as the piston 16 approaches IDC so that when the projection 66 enters the port 68 the remaining air trapped in the cylinder 12 is forced through the narrower, portion 70 of the port 68 remaining open, increasing the speed of the air and enhancing mixing with the fuel/air mixture entering the combustion chamber 60 from the minor cylinder 14.

The port 68 extends the full length of the combustion chamber 60, as does the entry port 44, and the projection 66 is shaped and positioned such that the portion 70 of the port 68 which is not filled by the projection 66 is adjacent the minor cylinder end of the combustion chamber. This ensures that extra air is concentrated near the minor cylinder end during the latter part of the compression stroke and serves to assist in preventing premature contact of the fuel/air mixture from the minor cylinder 14 with the catalyst.

One important advantage of the arrangement of FIGS. 2 to 21 is that it enables the conversion of an existing cylinder block into a catalytic engine configuration by replacing the cylinder head with a catalytic engine head which need be no higher than the normal engines head, but will be somewhat wider.

Figure 22:
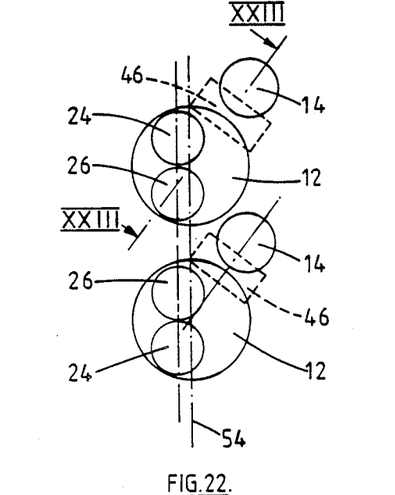
FIG. 22 is a diagrammatic plan view of a further embodiment of an internal combustion engine according to the present invention.
Figure 23:
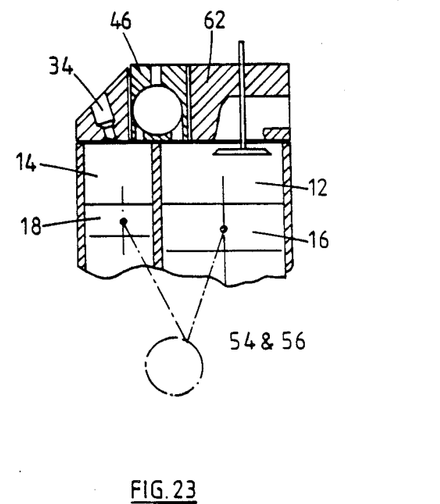
FIG. 23 is a partial section along the line XXIII—XXIII of FIG. 22.

FIGS. 22 and 23 show a further embodiment of internal combustion engine in accordance with the present invention. FIG. 22 is plan view showing an arrangement of two pairs of cylinders 12, 14 which allows all of the cylinders to share a common crankshaft 54 (with or without a rocking lever arrangement for the minor cylinders connecting rods). In this arrangement, the fuel injector 34 of each fuel management cylinder 14 is located in the cylinder head 62 but may equally be positioned in the cylinder wall as shown in the embodiments of FIGS. 1 to 21.

Figure 24:
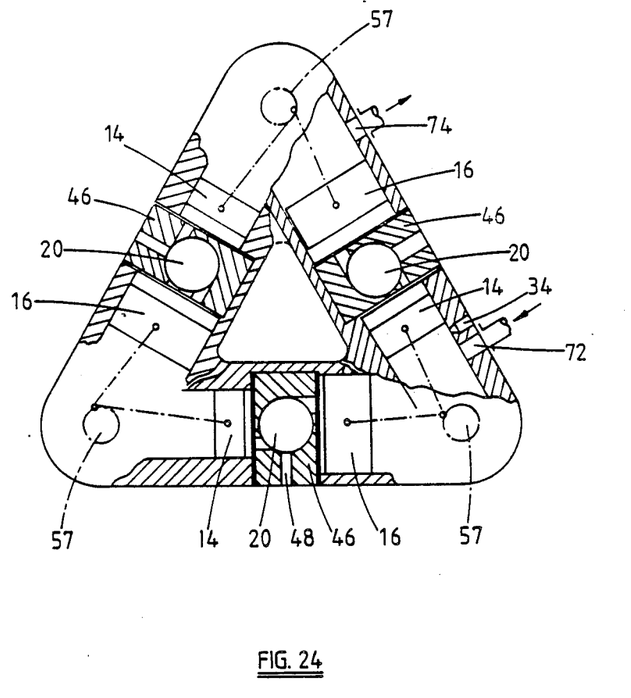
FIG. 24 is a partial section through a further, deltic form of multicylinder internal combustion engine according to the present invention.

FIG. 24 shows a deltic multi-cylinder arrangement which is suitable for heavy goods vehicles. This arrangement operates on a two-stroke principle. Each arm of the triangular arrangement has in line major and minor cylinders 12, 14 with pressurised air being inducted through inlet ports 72, and exhaust gases discharged through exhaust ports 74 exposed by the pistons 14, 16 in the usual way. Three crankshafts 57 are provided, each being coupled with a major piston 16 and minor piston 14 of adjacent arms of the arrangement. One or more deltic sections can be added to provide six or more cylinders.

The deltic arrangement may use three combustion chamber cannisters of the vortex type 46 and have three ports 34 for low pressure fuel injectors in each section.

The Timing of Ignition

The engine has no external means of timing the ignition process. This is best understood in comparison with a spark ignition engine timed by the spark or a diesel engine timed by the injection of fuel into the combustion chamber where the compressed air is hot enough to initiate the ignition process. In the preferred engine according to this invention, the "ingression" of rich fuel/air mixture by the minor piston 18, through the partition plate 40, into the combustion chamber does not initiate ignition. It is first followed by at least partial mixing of the fuel with the air in the chamber, and when fuel molecules reach the catalytic surface, a chemical reaction is iniated which leads to the ignition of the bulk of the fuel.

The mixing action continues during ignition and combustion with continuous vortex movements of the gases. The rotating gases continue to make contact with the catalyst surface after initial ignition, allowing a continuous ignition process to take place by renewed contact with the catalyst and/or by flame propogation. Ignition takes place over most of the inner surface of the combustion chamber ensuring a rapid and full combustion. Since the catalyst can ignite very weak fuel/air mixtures full combustion of lean mixtures is possible. Control of the ignition timing of the engine can be effected by any one of the following alone or in combination.

(a) Adjustment of the spacing 64 (distance X) of the catalyst surface from the small piston 18 IDC position which is set at the manufacturing stage.

(b) The reduction of pressure, hence temperature, produced in the engine at the point of minimum volume. This may be achieved by throttling the air intake to the engine during running, e.g. with the butterfly valve 32.

This allows control of ignition timing during the operation of the engine. The faster the engine rotates the less throttling is required, since the volumetric efficiency of an engine is decreased at increasing engine speed. In addition, a slight ignition advance may be desirable at higher engine speeds to accommodate ignition delay, however small.

(c) The small piston 18 may be coupled with the larger piston 16 to provide a slight preset lag or lead of the small piston relative to the larger piston. In this way the initiation of combustion can be retarded/advanced to suit a particular combustion chamber design and a particular fuel.

Starting the Engine

Since the engine is a compression ignition engine it requires external assistance for a rapid start up particularly from cold conditions. This is preferably effected by using a glow plug in the combustion chamber which is energised whilst the engine is being cranked by a starter motor. Alternatively, a small spark plug with access to the combustion chamber can be energised during cranking for starting by a continuous stream of sparks generated, e.g. electronically.

The Operation of the Engine

The embodiments described above all operate in substantially the same manner, and the following description applies generally to all of the four stroke cycle engines.

Induction Stroke

After the pistons reach IDC, preferably together, the inlet valve opens to admit air into the engine and both pistons 16, 18 begin the induction stroke. Some of the inducted air is drawn into the smaller cylinder 14 through the combustion chamber. It may be advantageous to impart swirl to the air as it enters the engine through the inlet duct by directing the air at a tangent to the cylinder 12 or by partial masking of the inlet valve. After the minor piston 18 uncovers the fuel injection port, liquid fuel is sprayed in atomised form into the air in the minor cylinder 14.

Compression Stroke

After reaching ODC, both pistons 16, 18 begin the compression stroke. Fuel may continue to be injected into the minor cylinder 14 until the minor piston 18 covers the injection port during the early part of the compression stroke.

The pressure and therefore the temperature rise brought about by compression helps to vaporise the liquid fuel droplets in the minor cylinder 14. This in turn lowers the temperature and pressure of the fuel/air mixture in the minor cylinder 14 compared with the temperature and pressure in the major air cylinder 12. As a result of this pressure difference air migrates through the combustion chamber 20 into the minor cylinder 14 from the major cylinder 12 so keeping the catalysed surface in the combustion chamber 20 in contact with the air only. This action also supplies extra air to mix with the fuel/air mixture in the minor cylinder 14 and has a compensating effect in that the more fuel that is sprayed into the cylinder, the greater the chilling effect and hence the more mass of air migrates into the fuel rich mixture so keeping the variations in fuel/air mass ratio small in relation to changing loads.

As is mentioned above, the air delivered to the combustion chamber 20 by the major piston 16 during the compression stroke is forced into a vortex motion inside the combustion chamber, thus assisting a rapid mixing with the fuel/air mixture gas delivered to the combustion chamber by the minor piston 18.

If the squish method is also used to assist rapid mixing of the gases, when the major piston 16 approaches IDC most of the air trapped inside the "squish" volume (FIGS. 19 to 21) is forced through the transfer ports 68, 44 to enter the combustion chamber 20 at or adjacent its end nearer the minor piston 18.

This action ensures that more oxygen is mixed with the rich fuel/air mixture nearer the minor cylinder end of the combustion chamber at the time when it enters the combustion chamber, when the pistons move near IDC. The extra volume of gas at that instant also helps to impart a higher velocity to the gases as they are forced through apertures in the partition plate, thus ensuring good distribution of fuel in the combustion chamber particularly the availability of fuel near the catalysed surface. The catalysed surface may be positioned to start some distance away from the aperture so that the arrival of the fuel at the catalysed surface takes place approximately when the pistons reach IDC.

Chemical reaction is initiated at the catalysed surface on contact of the fuel/air mixture with the surface and this raises the temperature and promotes the ignition of the remaining gases. The expansion of gases due to combustion is in a direction away from the catalysed surface into the remaining unburned fuel and air and this assists in further mixing of gases in the combustion chamber. Since ignition does not occur at a point, as in spark ignition, but takes place over the catalysed surface almost simultaneously, the rate of reaction is very rapid allowing the engine to operate at high rotational speeds.

Expansion Stroke

Both pistons move away from IDC allowing the burnt gases to expand and deliver work through the pistons to the crankshafts.

Exhaust Stroke

The exhaust valve opens, allowing the products of combustion to be ejected by both pistons moving towards TDC. Some product gases remaining in the combustion chamber may remain in the cylinder to mix with the incoming air.

The various forms of engine in accordance with the present invention described in relation to the accompanying drawings incorporate a fundamentally new approach to the combustion process which determines to a large extent the economy and exhaust emission achieved by the engine and gives rise to the following advantages:

1. Use of high compression ratios (12–16:1)
2. Use of low octane lead-free gasolene
3. Lean burn capability, low exhaust emission
4. Simple fuel injection system
5. No spark electrics
6. High rotational speeds
7. Rapid combustion, high specific power output
8. Alternative to the spark ignition engine and the diesel engine
9. Either 4 or 2 stroke cycle
10. Removable combustion chamber for catalyst maintenance
11. Exhaust pipe emission control eliminated
12. Cylinder head conversion possible for existing engines
13. Reduced pumping losses at part load
14. Convenient engine layout arrangement for easy access and maintenance.

While the present invention has been described and illustrated with reference to ignition by means of a catalyst, it is also possible to use instead of the catalyst, a spark ignition device or a hot surface ignition device such as a spark plug or glow plug 52 (FIG. 4) in the aperture 48 or a hot ceramic surface. The previous description of the preferred embodiments applies equally to the use of spark ignition and hot surface ignition devices. The hot ceramic surface may be positioned in the combustion chamber as part or all of the surface of the combustion chamber, as previously described for the catalyst. The combination of the fuel management cylinder and the vortex mixing means still allows the use of a high compression ratio range 12:1 to 16:1 with low octane fuel irrespective of the form of the ignition means.

It will be appreciated by those skilled in the art that any of the features described with respect to any engine embodiment may be used on any other of the described embodiments.

What is claimed:

1. An internal combustion engine comprising at least one pair of first and second cylinders interconnected at their head ends by a combustion chamber, said first cylinder having a larger swept volume than said second cylinder;

means for delivering a charge of air to said first cylinder and means for delivering a charge of fuel to said second cylinder, said second cylinder being a fuel management cylinder;

substantially continuous ignition means in said combustion chamber;

respective first and second pistons movable in said cylinders towards and away from said combustion chamber;

means for restricting movement of fuel/air mixture from said fuel management cylinder into said combustion chamber until combustion is required;

and mixing means for delivering air with a vortex motion from the first cylinder to the combustion chamber for assisting rapid mixing in said combustion chamber of a fuel/air mixture from said fuel management cylinder with air from said first cylinder.

2. An engine as claimed in claim 1 wherein said fuel management cylinder includes means for delivering said fuel/air mixture into said combustion chamber as substantially a gas stream.

3. An engine as claimed in claim 1 wherein the combustion chamber has an inner surface which is substantially continuously curved about at least one axis.

4. An engine as claimed in claim 3 wherein said combustion chamber has a section thereof which is substantially circular.

5. An engine as claimed in claim 3 wherein said combustion chamber is substantially spheroidal.

6. An engine as claimed in claim 3 wherein said combustion chamber is substantially spherical.

7. An engine as claimed in claim 3 wherein said mixing means is operable to direct at least a stream of said air into said combustion chamber at a preselected angle to impart a vortex motion to said stream in the combustion chamber.

8. An engine as claimed in claim 7 wherein said mixing means is operable to deliver said fuel/air mixture into the combustion chamber substantially along an axis of the combustion chamber.

9. An engine as claimed in claim 8 wherein said mixing means is operable to delivery said fuel/air mixture into the combustion chamber radially thereof.

10. An engine as claimed in claim 8 wherein said mixing means is operable to deliver said air and said fuel/air mixture into said combustion chamber as streams of gas moving in opposite directions to one another.

11. An engine as claimed in claim 7 wherein said mixing means is operable to deliver said air and said fuel/air mixture into said combustion chamber on streams of gas moving in substantially the same rotational sense.

12. An engine as claimed in claim 8 wherein said mixing means comprises respective ports opening into said combustion chamber at preselected angles thereto for conducting respectively air and air/fuel into said combustion chamber from said cylinders.

13. An engine as claimed in claim 1 wherein said first and second cylinders are arranged with their longitudinal axes substantially at right angles to one another.

14. An engine as claimed in claim 1 wherein said second cylinder has a fuel inlet port formed in a side wall of said cylinder and a fuel injector means for injecting fuel through said port, and wherein said port is spaced from the outer dead center position of said second piston by an amount such that the maximum fuel injection time required by the engine is at least equal to the time the port is uncovered by said piston.

15. An engine as described in claim 1 wherein said pistons are in fixed phase relationship to one another.

16. An engine as claimed in claim 1 wherein said pistons are reciprocable and said first cylinder is adapted to receive a charge of air only.

17. An engine as claimed in claim 1 wherein said ignition means is a catalyst ignition means.

18. An engine as claimed in claim 17 wherein said catalyst ignition means is a catalyst formed on a wall of said combustion chamber.

19. An engine as claimed in claim 1 wherein said ignition means is a spark ignition means.

20. An engine as claimed in claim 1 wherein said ignition means is a hot surface ignition means.

21. An engine as claimed in claim 3 wherein said combustion chamber has a section thereof which is substantially elliptical.

22. An engine as claimed in claim 3 wherein said combustion chamber is substantially cylindrical.

23. An engine as claimed in claim 3 wherein said axis is substantially at right angles to the axis of said first cylinder.

* * * * *